Figure 1:
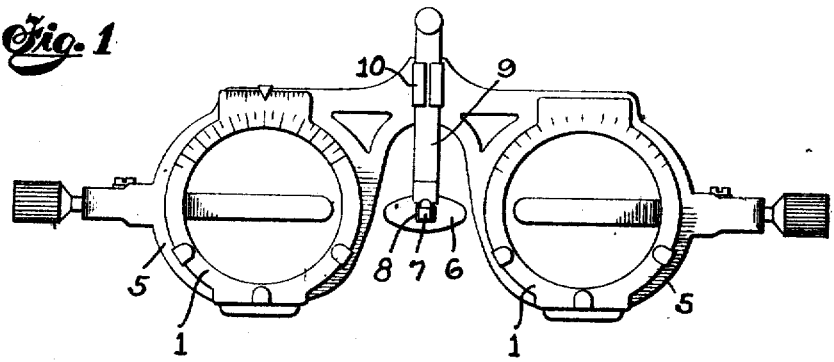

Jan. 15, 1924.  H. G. HEROLD ET AL  1,481,007

TRIAL FRAME

Filed July 15, 1921

Patented Jan. 15, 1924.

1,481,007

UNITED STATES PATENT OFFICE.

HARRY G. HEROLD, OF HASBROUCK HEIGHTS, NEW JERSEY, AND EMIL B. MEYROWITZ, OF NEW YORK, N. Y., ASSIGNORS TO E. B. MEYROWITZ, INC., OF NEW YORK, N. Y., A CORPORATION OF NEW YORK.

TRIAL FRAME.

Application filed July 15, 1921. Serial No. 484,918.

*To all whom it may concern:*

Be it known that we, HARRY G. HEROLD, citizen of the United States, and resident of Hasbrouck Heights, county of Bergen, and State of New Jersey, and EMIL B. MEYROWITZ, citizen of the United States, and resident of the city, county, and State of New York, have invented an Improvement in Trial Frames, of which the following is a specification.

The present invention relates to an improvement in trial frames for eye glass lenses, the object of which is to afford a device of durable and simple construction and capable of superior accuracy in use. Various deficiencies are found in types of trial frames heretofore furnished to opticians and oculists and it is one of the objects of this invention to eliminate them and to provide a frame in which the interpupillary distance may be varied without producing error in the reading due to twisting or distorting the lens holders out of their proper position normal to the axis of the pupil. In using the well known type of frame consisting of a supporting bar, lens holders, and temples fastened to the lens holders, the parts very quickly lose their proper relative positions and, more particularly, the lens holders are twisted out of their true axial positions and therefore do not give true readings on the annular axis scales forming a part of or co-operating with said holders. It is a further object of our invention to provide a trial frame by which a true reading of the axis scale may be obtained. The desired results are obtained by providing a rigid support and guide for the lens holders which will be unaffected by adjusting or measuring movement of the lens holders and will therefore maintain the same in the required position with respect to the axis of the pupil.

One embodiment of our invention is illustrated in the drawings accompanying the present specification, and in which—

Figure 2:
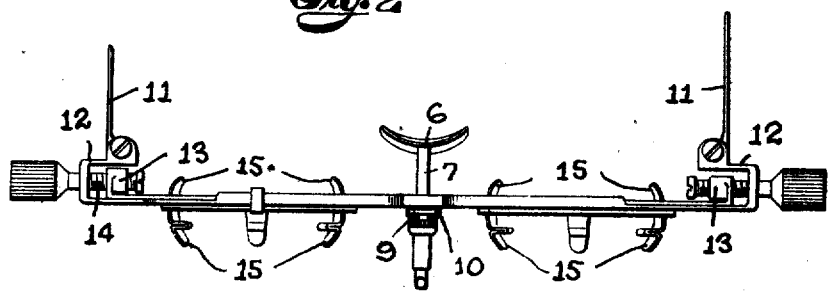
Figure 3:
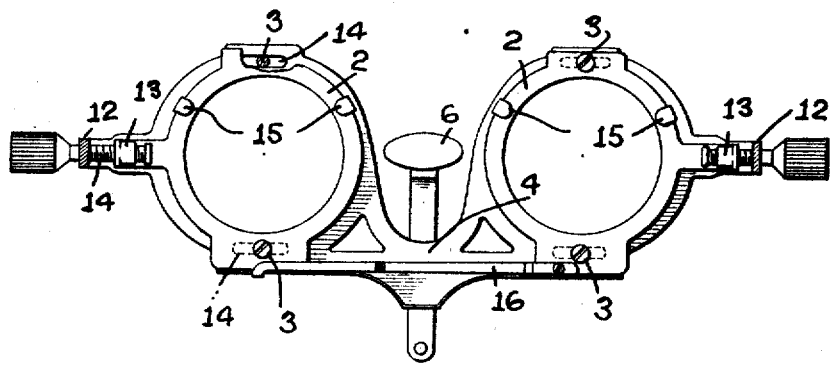

Figure 1 is a front inverted elevation,
Figure 2 a top plan view, and
Figure 3 a rear inverted elevation.

The drawings disclose as an illustrative embodiment of our invention a trial frame comprising a pair of lens holders each including front and rear portions 1 and 2, respectively, connected by suitable means such as a rivet 3, and operatively mounted on a support or face plate which preferably consists of a transverse member or bridge 4 and depending apertured members 5 integral with the bridge. The bridge supports a suitable nose piece 6 which is secured at one end of a bar 7 slidably mounted in a housing 8, said housing being in turn secured to a bar 9 slidably mounted on the bridge and retained thereon by means of co-operating cleats 10.

The improved frame also includes suitable temples 11 each pivotally secured at one side of a depending apertured member, said member being provided with a laterally extending lug 12 integral therewith and bent to form a box to one wall of which the temple 11 is connected. Thus with the bridge, depending apertured members and bar supporting lugs in one piece we provide a relatively rigid support for the movable and adjustable portions of the device. This support has slotted openings 14, a pair for each lens holder, one slot of a pair being in the bridge portion above the aperture while the other is positioned parallel thereto and below the aperture. In the illustrated embodiment, the pins or rivets 3 pass through their respective slots, thus supporting the lens holders therein at top and bottom and permitting them to slide freely with respect to the rigid support. The lens holder may be actuated by any suitable means but, as shown in the drawings, we prefer to provide the rear portion 2 of the lens holder with a laterally extending lug 13 having its free end bent to form a box, one wall of which has a threaded opening to receive a set screw 17. The laterally exposed wall of the box formed by bending the lug 12 is provided with a hole which registers with the threaded opening in the wall of the bent over portion of the lug 13 and engages an annularly grooved portion of the set screw to prevent longitudinal movement thereof, so that when the latter is rotated the lens holder will be moved laterally.

It is contemplated that the lens holders will be equipped with suitable lens retaining members such as the lugs or spurs 15 which will support lenses and permit rotation or other movement thereof to secure the desired axial adjustment with reference to a suitable axis scale which may conveniently be incorporated in the face of the front member 1 of the lens holder.

One of the lens holders will also be provided with an interpupillary distance indicating scale while the other lens holder carries a pointer or index arm 16 positioned to co-operate with the scale and to move relatively thereto when said other lens holder is operatively moved back and forth for adjustment.

To further insure rigidity of the device the upper edge of the bridge is bent to form an angle which may also serve, if desired, as an additional guiding member for the upper edge of the rear member 2 of the lens holders.

In operation it is contemplated that the trial frame will be set in position with the nose piece supporting it at the correct distance from the patient's eyes and the temples resting above the patient's ears. The lens holder at the left, Figure 3 will then be moved relatively to the face plate by means of the set screw, until the center of the circular opening therein coincides with an extension of the axis of the pupil of the patient's eye. The other lens holder will then be adjusted similarly if necessary and the interpupillary distance will be indicated on the scale by the pointer. Adjustment for positioning of the cylindrical axis may then follow if required.

From the foregoing description and statement of mode of operation it will be apparent that our improved trial frame affords a very accurate and reliable instrument in the use of which fine adjustments are insured. The rigid unitary construction of the main body member or face plate and the two point support of the lens holders therein combined with the positioning of the lens holder moving means to be effective substantially in a horizontal line passing midway between the support points adds further to the durability of the device and its continued precision of adjustment and operation.

We claim as our invention:

1. A trial frame for fitting eye glass lenses comprising a face plate having an aperture and parallel guiding slots arranged respectively above and below said aperture and a lens holder having a member disposed forwardly of the face plate, a member disposed rearwardly thereof, and holder supporting means passing through the slots and connecting said members.

2. A trial frame for fitting eye glass lenses comprising a unitary body portion providing a bridge, a pair of apertured members depending therefrom and a lug extending laterally from each of said depending apertured members, said lug being bent to form a box, a lens holder slidably mounted on each of said depending apertured members, and means co-operating with said box to impart lateral movement to the lens holders.

In testimony whereof, we have signed our names to this specification this 6th day of July 1921.

HARRY G. HEROLD.
EMIL B. MEYROWITZ.